(12) United States Patent
Fu et al.

(10) Patent No.: US 10,567,824 B2
(45) Date of Patent: Feb. 18, 2020

(54) METHODS AND SYSTEMS FOR SELECTING INVENTORY UNITS FOR TELEVISION AND OTHER MEDIA ADVERTISING CAMPAIGNS

(71) Applicant: Simulmedia, Inc., New York, NY (US)

(72) Inventors: Xiao Fu, New York, NY (US); Kyle J. Hubert, New York, NY (US); Mainak Mazumdar, New York, NY (US)

(73) Assignee: Simulmedia, Inc., New York, NY (US)

( * ) Notice: Subject to any disclaimer, the term of this patent is extended or adjusted under 35 U.S.C. 154(b) by 51 days.

(21) Appl. No.: 14/871,380

(22) Filed: Sep. 30, 2015

(65) Prior Publication Data

US 2017/0094337 A1    Mar. 30, 2017

(51) Int. Cl.
| | |
|---|---|
| *H04N 21/2668* | (2011.01) |
| *H04N 21/81* | (2011.01) |
| *H04N 21/258* | (2011.01) |
| *H04N 21/262* | (2011.01) |

(52) U.S. Cl.
CPC ... *H04N 21/2668* (2013.01); *H04N 21/25891* (2013.01); *H04N 21/26241* (2013.01); *H04N 21/812* (2013.01)

(58) Field of Classification Search
CPC ........... H04N 21/258; H04N 21/25883; H04N 21/2668; G06Q 30/0246; G06Q 30/0224; G06Q 30/0243; G06Q 30/0245; G06Q 30/0244
See application file for complete search history.

(56) References Cited

U.S. PATENT DOCUMENTS

| | | | |
|---|---|---|---|
| 6,286,005 B1 * | 9/2001 | Cannon | .................. G06F 17/30 |
| 7,835,937 B1 | 11/2010 | Karlsson et al. | |
| 8,087,041 B2 | 12/2011 | Fu et al. | |
| 8,112,301 B2 | 2/2012 | Harvey et al. | |

(Continued)

OTHER PUBLICATIONS

Lynch, et al., "Examination of qualitative viewing factors for optimal advertising strategies," Journal of Advertising Research, vol. 39(3), May-Jun. 1999, 7-16.

*Primary Examiner* — Anthony Bantamoi
(74) *Attorney, Agent, or Firm* — Foley Hoag LLP; Rajesh Vallabh (57) ABSTRACT

Computer implemented methods and systems select television inventory units for a television advertising campaign. The method includes: (a) receiving information identifying (i) a target television audience, (ii) a plurality of television inventory units and a given price for each television inventory unit, and (iii) a budget for the television advertising campaign; (b) determining the probability of the target television audience viewing each of the plurality of television inventory units based on historical television viewing data; (c) for feasible combinations of television inventory units meeting the budget for the television advertising campaign, determining an expected target television audience reach based on the probabilities determined in step (b); and (d) selecting the feasible combination of television inventory units providing the greatest television audience reach for the television advertising campaign. The methods and systems can also be used for other media advertising campaigns including, e.g., radio, Internet broadcast, or video-on-demand advertising campaigns.

38 Claims, 3 Drawing Sheets

(56) References Cited

U.S. PATENT DOCUMENTS

| | | |
|---|---|---|
| 8,255,949 B1 * | 8/2012 | Bayer ................ G06Q 30/0241 |
| | | 725/32 |
| 8,516,515 B2 | 8/2013 | Zigmond et al. |
| 8,627,356 B2 | 1/2014 | Storan et al. |
| 8,799,095 B2 | 8/2014 | Ginsburg et al. |
| 8,887,188 B2 | 11/2014 | Hadfield et al. |
| 8,935,721 B2 | 1/2015 | Tidwell et al. |
| 2008/0263578 A1 | 10/2008 | Bayer et al. |
| 2008/0271070 A1 * | 10/2008 | Kanojia ................. H04N 7/025 |
| 2009/0006145 A1 * | 1/2009 | Duggal et al. ......... G06Q 10/00 |
| 2009/0150224 A1 | 6/2009 | Lu et al. |
| 2009/0248478 A1 * | 10/2009 | Duggal ................. G06Q 30/02 |
| | | 705/14.42 |
| 2013/0006706 A1 | 1/2013 | Harvey et al. |
| 2013/0218668 A1 * | 8/2013 | Parekh ................. H04H 20/38 |
| | | 705/14.45 |
| 2013/0254787 A1 | 9/2013 | Cox et al. |
| 2014/0200995 A1 * | 7/2014 | Siegman ............ G06Q 30/0247 |
| | | 705/14.46 |
| 2015/0112795 A1 | 4/2015 | Jalali et al. |
| 2016/0125454 A1 * | 5/2016 | Karloff .............. G06Q 30/0249 |
| | | 705/14.48 |

* cited by examiner

METHODS AND SYSTEMS FOR SELECTING INVENTORY UNITS FOR TELEVISION AND OTHER MEDIA ADVERTISING CAMPAIGNS

BACKGROUND

The present application relates generally to media advertising and, more specifically, television advertising. In particular, the application relates to computer-implemented methods and systems for selecting inventory units for a television advertising campaign to optimize audience reach for a target television audience.

An inventory unit is a time block (i.e., a specific time period (e.g., primetime, a specific hour, during certain content, etc.) during which one or more television programs are aired on a particular channel or network) or a particular television program or series, during which television advertisements can be displayed to viewers.

Advertisers use television for its broad reach, but plan campaigns according to impressions, which are the number of times any viewer sees a particular advertisement. Use of impressions is the easiest way to quantify expected results of an advertising campaign. Measuring impressions, however, is a proxy to the real value of television advertising, which is broad reach. Reach refers to the number of unique viewers who see a particular advertisement.

The value of individual television inventory units is indexed to a price-to-impressions metric. Since advertisers typically have limited budgets, they tend to purchase inventory having the best index. When this planning method is used, a final number representing the potential of success for the campaign is the summation of the individual inventory units' impressions. This can lead to inefficient results. For instance, if an advertiser buys two inventory units back to back, there is a high likelihood that the same viewer will watch both advertisements. This amounts to twice the spend to show the same viewer the same advertisement, which is an inefficient use of an advertising campaign budget.

It would be desirable for advertisers to improve the efficiency of their advertising campaigns by, e.g., spending less money to achieve the same or greater effectiveness in terms of audience reach, or the same amount of money to achieve greater reach.

BRIEF SUMMARY OF THE DISCLOSURE

In accordance with one or more embodiments, a computer implemented method is disclosed for selecting television inventory units for a television advertising campaign. The method includes the steps performed by a computer system of: (a) receiving information identifying (i) a target television audience, (ii) a plurality of television inventory units and a given price for each television inventory unit, and (iii) a budget for the television advertising campaign; (b) determining the probability of the target television audience viewing each of the plurality of television inventory units based on historical television viewing data; (c) for feasible combinations of television inventory units meeting the budget for the television advertising campaign, determining an expected target television audience reach based on the probabilities determined in step (b); and (d) selecting the feasible combination of television inventory units providing the greatest television audience reach for the television advertising campaign.

A computer system in accordance with one or more embodiments includes at least one processor; memory associated with the at least one processor; and a program supported in the memory for selecting television inventory units for a television advertising campaign. The program contains a plurality of instructions which, when executed by the at least one processor, cause the at least one processor to: (a) receive information identifying (i) a target television audience, (ii) a plurality of television inventory units and a given price for each television inventory unit, and (iii) a budget for the television advertising campaign; (b) determine the probability of the target television audience viewing each of the plurality of television inventory units based on historical television viewing data; (c) for feasible combinations of television inventory units meeting the budget for the television advertising campaign, determine an expected target television audience reach based on the probabilities determined in step (b); and (d) select the feasible combination of television inventory units providing the greatest television audience reach for the television advertising campaign.

In accordance with one or more embodiments, a computer-implemented method is provided for selecting television inventory units for a television advertising campaign to optimize audience reach for a desired target television audience. The method includes the steps of: (a) calculating, by a computer system, a projected probability that members of the target audience will view a range of television inventory units based on historical viewing data; and (b) searching, by the computer system using a convex optimization process, for a feasible combination of inventory units meeting the television advertising campaign budget that has the highest expected reach for the target audience.

DETAILED DESCRIPTION

Various embodiments disclosed herein relate to computer-implemented methods and systems for selecting television inventory units for a television advertising campaign to optimize audience reach for a target audience.

Figure 1:
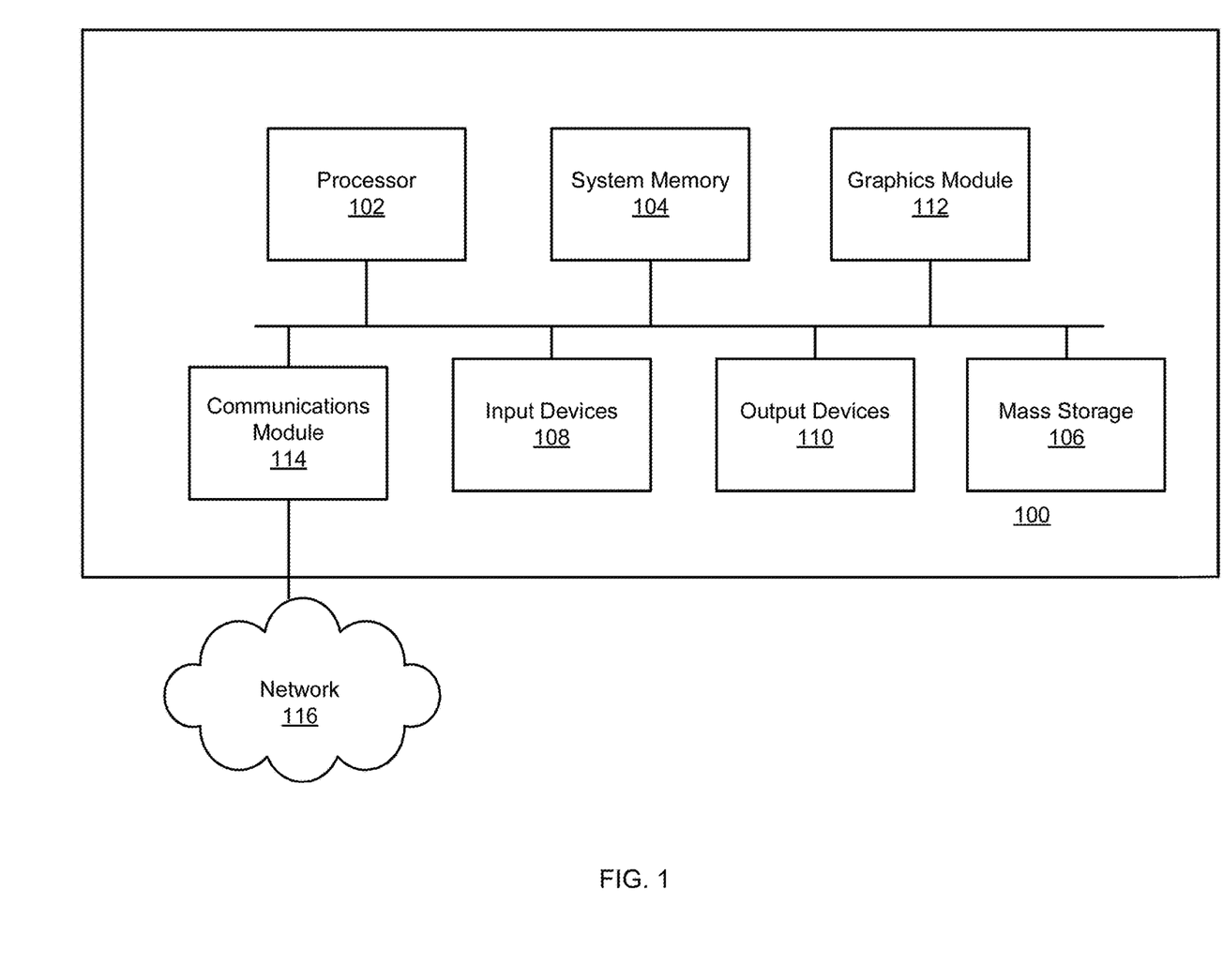
FIG. 1 is a simplified block diagram illustrating an exemplary computer system for selecting inventory units for a television advertising campaign in accordance with one or more embodiments.

The methods and systems described herein may be implemented in one or more computer programs executing on a programmable computer system. FIG. 1 is a simplified block diagram illustrating an exemplary computer system 100, on which the computer programs may operate as a set of computer instructions. The computer system 100 includes at least one computer processor 102 and a system memory 104 (including a random access memory and a read-only memory) readable by the processor 102. The computer system also includes a mass storage device 106 (e.g., a hard disk drive, a solid-state storage device, an optical disk device, etc.). The computer processor 102 is capable of processing instructions stored in the system memory or mass storage device. The computer system additionally includes input/output devices 108, 110 (e.g., a display, keyboard, or pointer device), a graphics module 112 for generating graphical objects, and a communication module or network interface 114, which manages communication with other computer systems via the Internet or other communications network or combination of networks 116. Each computer program can be a set of instructions or program code in a code module resident in the random access memory of the computer system. Until required by the computer system, the set of instructions may be stored in the mass storage device or on another computer system and downloaded via the Internet or other network.

Advertisers can use the computer system 100 to identify which television inventory units to purchase for a television advertising campaign to optimize audience reach for a desired target audience. In accordance with one or more embodiments, the computer system 100 comprises one or more computer servers, which advertisers can access using client computer devices over the Internet or other network to plan advertising campaigns.

Figure 2:
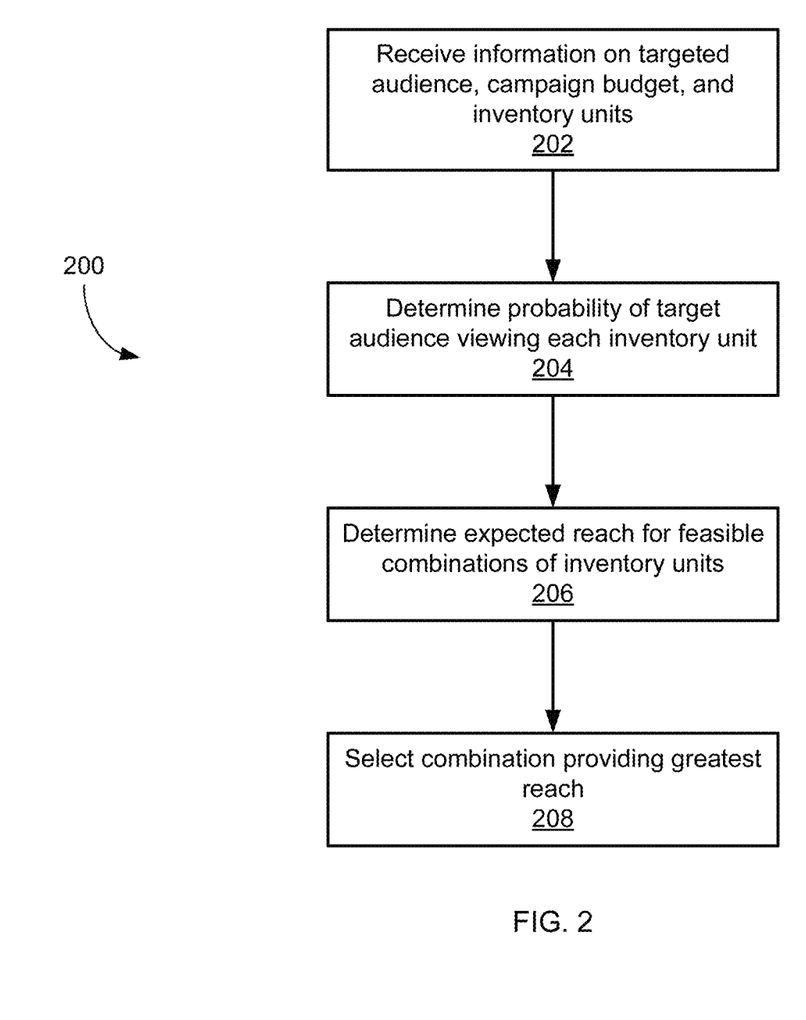
FIG. 2 is a simplified flow chart illustrating an exemplary method for selecting inventory units for a television advertising campaign in accordance with one or more embodiments.

FIG. 2 is a flowchart illustrating a simplified exemplary process 200 for selecting television inventory units for television advertising campaign in accordance with one or more embodiments. At step 202, the system receives from an advertiser information identifying a desired target audience and a budget for the advertising campaign. The system also receives information on television inventory units and a given price for each unit.

The target television audience comprises a subset of the total television audience that the advertiser wants to reach. The target television audience can be selected based on various viewer characteristics including, e.g., viewer demographics, viewing behavior, or viewer purchasing characteristics.

At step 204, the system calculates a projected probability for each member of the target audience viewing the inventory units based on historical viewing data. The probabilities are expressed over the range of inventory units that can be purchased for the campaign.

The historical viewing data of target audiences is collected and organized according to time spent watching television on different networks. The historical viewing data can be obtained from various sources including, e.g., reporting logs from viewing devices and viewer panel data from media ratings and measurement services like Nielsen Media Research, Comscore, Arbitron, etc.

By looking at the viewers' historical viewing patterns, the system can project the probability that viewers will watch a future airing of an inventory unit. In one or more exemplary embodiments, the probability is reduced to a continuous number between 0 and 1. On this scale, 0 means they are not at all likely to watch an inventory unit, and 1 means they will undoubtedly watch an inventory unit. The system collects all of the viewers' probabilities for all inventory units available for purchase.

The system then searches for the optimal purchase of inventory units that has the highest probability of reaching the target audience. More specifically, the system analyzes the most feasible combinations of television inventory units meeting the campaign budget for their expected target television audience reach based on the historical data at step 206. At step 208, the system selects the feasible combination providing the greatest television audience reach for the campaign.

In one or more exemplary embodiments, a convex minimization process is used to predict the minimal number of viewers that will not be reached given the budget of the advertiser. This particular technique is an inversion of the maximum number of people that are expected to be reached.

The resultant inventory units provide the maximum reach an advertiser can obtain given their budget. The system can show advertisers a logarithmic reach curve that describes the diminishing returns for a campaign for various budgetary spends. This can inform advertisers on how to adjust their spend, or whether they should modify the target audience they wish to reach.

Buying inventory according to maximum reach will increase efficiency and reduce waste in advertising campaigns. In addition, by adjusting their budget, advertisers can be shown how much reach can be purchased, and thereby search for optimal spend.

The following describes in greater detail an exemplary inventory unit selection process in accordance with one or more embodiments.

A) A target television audience is selected by the advertiser according to ancillary information about the advertiser's customers (e.g., customer demographics, viewer behavior, and viewer purchasing characteristics). The advertiser also specifies a television advertising campaign budget.

B) The system receives or collects historical data on audience television viewing patterns over time.

C) The system maps inventory units to networks and times.

D) The system projects audience viewing patterns into future available inventory and calculates the probability that viewers will view each inventory unit. The probabilities are expressed as numbers between 0 and 1.

E) The system collects all viewer's probabilities for all inventory units.

F) The system inverts probabilities to the probability the viewers will not be watching an inventory unit.

G) The system uses a formula to describe all inventory units as variables. The inventory units are mapped to variables, and the variables are used to create the formula. These variables must adhere to the campaign budget constraint, and any other constraint an advertiser wishes to input.

The expected number of people reached by a given a list of inventory units can be estimated by calculating the probability of reaching one viewer in the panel.

$$\sum_{v \in V} W_v \left[ 1 - \prod_{i \in N} (1 - p_{iv})^{x_i} \right]$$

v: Viewer v
V: All viewers in the panel for this target
i: Inventory unit i
N: All inventory units or spots available for this campaign
If for one inventory unit, the available spots is higher than 1, the inventory unit is split so that each inventory unit will only have one available spot.
$x_i$: Select or not select an inventory unit i. Binary variable.
$p_{iv}$: The probability of reaching viewer v through inventory unit i
$W_v$: The weight of a viewer when sampled. If not sampled, then weight is 1.

H) The system solves for optimal variables that have the lowest expected reach.

I) The optimal choices are found using convex optimization. The results are returned in real numbers, and since partial inventory units cannot be purchased (and are not feasible results), this process will need to be redone.

J) The system selects an inventory unit to constrain, and forces it to be either purchased, or not, in order to make a result feasible.

K) The system repeats steps H-J until all variables are integers.

L) The variables are the results that become the inventory units to buy, which become the advertising campaign.

M) In addition, by adjusting the target audience, advertisers can be shown how much reach can be purchased, and thereby search for optimal audiences given a static budget.

Example

The following is a simple example of the inventory unit selection process for an advertising campaign in accordance with one or more embodiments to optimize audience reach. The predicted number of impressions is also calculated for reference.

The campaign budget in this example is $1000. There are four available inventory units: A, B, C, and D. Pricing information for the four inventory units is shown below.

| Inventory Unit | A | B | C | D |
| --- | --- | --- | --- | --- |
| Price | $800 | $500 | $300 | $200 |

The advertiser has selected three desired viewers: X, Y, and Z. The weights of the targets representing their proportion of the total television viewing audience are shown below.

| Viewer | X | Y | Z |
| --- | --- | --- | --- |
| Weight | 3000 | 1000 | 2000 |

First, the system calculates the probability Viewer Y watched inventory unit A based on historical viewing data. Viewer Y watched the inventory unit A program for 48 minutes out of one hour. So the probability of Viewer Y watched a spot in inventory unit A is $P(Y$ watched a spot in $A)=48/60=80\%$.

Using historical viewing data, the system computes the probability each Viewer has watched a particular spot in an inventory unit in the past and predicts the probability the Viewer will watch a future inventory unit by using an exponential smoothing method.

The system then computes all the historical probability shown below.

| Week | Historical data |
| --- | --- |
| 1 | 0.80 |
| 2 | 0.50 |
| 3 | 0.70 |
| 4 | 0.15 |

The system applies an exponential smoothing method to predict the probability of Viewer Y watching inventory unit A. In this particular example, $\alpha$ is chosen to be 0.8. This number can be varied.

$S_0 = x_0$ $S_t = \alpha x_t + (1-\alpha) S_{t-1}, t>0$

Where $\alpha$ is the smoothing factor, and $0<\alpha<1$

| Week | Historical data | Forecasting |
| --- | --- | --- |
| 1 | 0.80 | 0.80 |
| 2 | 0.50 | 0.56 |
| 3 | 0.70 | 0.67 |
| 4 | 0.15 | 0.25 |

Thus, the system inputs 25% into the reach optimization as the estimated probability that respondent Y watches inventory unit A.

Figure 3:
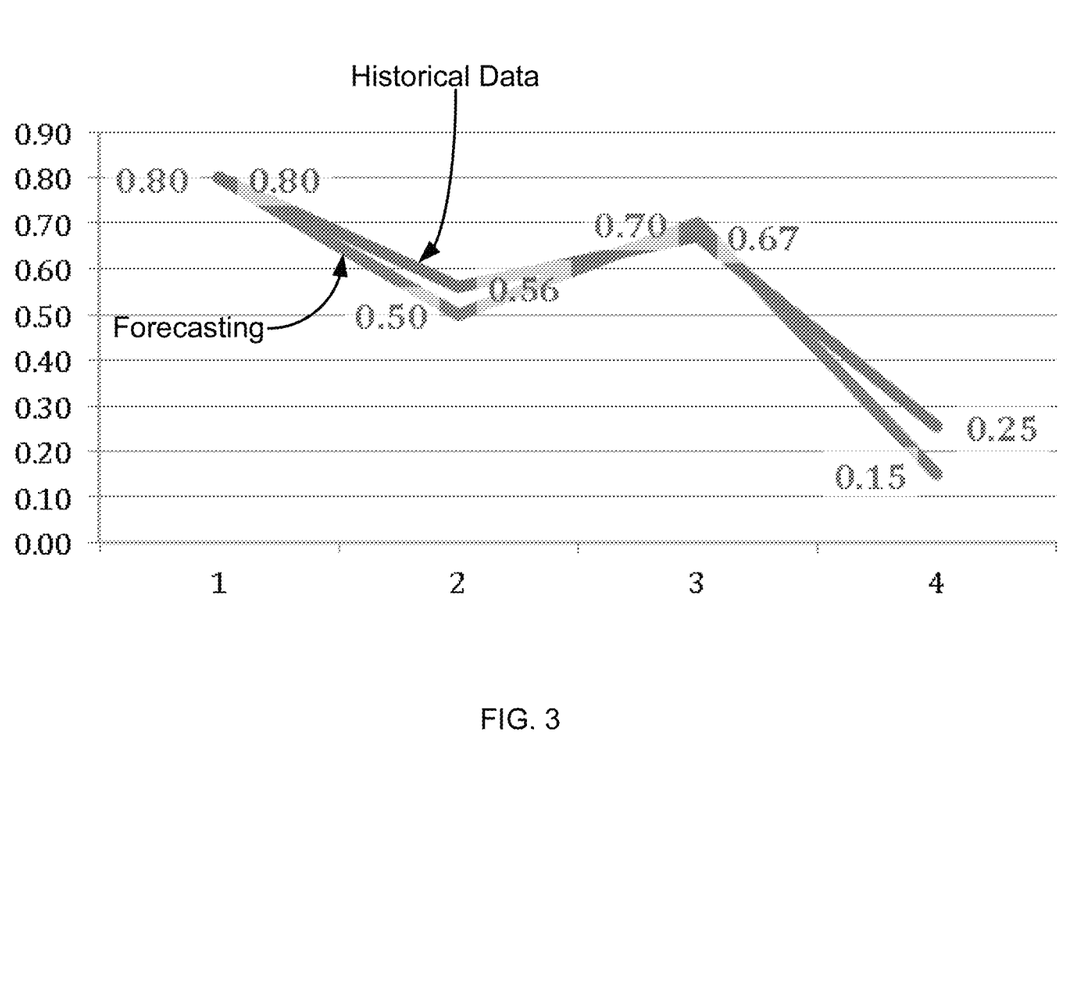
FIG. 3 is a graph illustrating exemplary results of an exponential smoothing prediction in accordance with one or more embodiments.

FIG. 3 graphically illustrates the results of the exponential smoothing prediction.

The system predicts the probability for each combination of Viewer and inventory unit as shown below.

|  | A | B | C | D |
| --- | --- | --- | --- | --- |
| X | 100% | 25% | 25% | 50% |
| Y | 25% | 75% | 0% | 0% |
| Z | 0% | 0% | 25% | 0% |

The system computes the expected reach and expected impressions for each respondent for combinations of inventory units. For example, if inventory units A and D are chosen, then the probability that respondent X sees the campaign advertisement at least one time, which is the expected reach for X, is calculated as $P(X$ sees the ad at least one time$)=1-1-1\times1-0.5=1$ Also, the expected times respondent X watches the campaign advertisement, which is the expected impressions for X, is calculated as $E$ (how many times $X$ sees the ad)$=1+0.5=1.5$ Then, the expected reach and impressions of the total audience represented by respondent X is calculated by multiplying the weight of X to compute the results.

$E$ (reach of audience represented by $X$)$=1\times3000=3,000$ $E$ (impression of audience represented by $X$)$=1.5\times 3000=4,500$ The expected reach and impression of audience represented by respondent Y and Z are also computed. In this way, the expected reach and impression of all audiences represented by X, Y and Z are computed together giving a plan of inventory unit chosen.

In this example, there are two possible plans: (1) inventory units A and D and (2) inventory units B, C, and D. The calculated expected reach and impression delivered by these two plans are shown below.

| Plan | Expected Reach | Expected Impressions |
| --- | --- | --- |
| A + D | 3,250 | 4,750 |
| B + C + D | 3,406 | 4,250 |

An advertiser choosing to maximize on impressions would choose plan A+D. An advertiser choosing to maximize reach would choose plan B+C+D, which could reach 156 more people than plan A+D.

While various embodiments disclosed herein refer specifically to the television medium, the inventory unit selection methods and systems described herein are also applicable to other media having inventory units including, e.g., radio, Internet broadcasts, video-on-demand, etc.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

What is claimed is:

1. A computer implemented method of selecting inventory units for a media advertising campaign comprising one or more advertisements, the method comprising the steps, each performed by a computer system, of:
   (a) receiving information identifying (i) a target media audience, (ii) a plurality of inventory units in which the one or more advertisements may be included and a given price for each inventory unit, and (iii) a budget for the media advertising campaign;
   (b) determining the probability of the target media audience viewing or listening to each of the plurality of inventory units based on historical audience data;
   (c) identifying a plurality of feasible combinations of inventory units meeting the budget for the media advertising campaign, then determining an expected target media audience reach for each feasible combination of inventory units based on the probabilities determined in step (b);
   (d) selecting the feasible combination of inventory units providing the greatest media audience reach for the media advertising campaign; and
   (e) displaying results of step (d) to a user in a graphical user interface and enabling the user to adjust one or more parameters to iteratively determine an optimal budget or an optimal target media audience and identifying a resultant combination of inventory units to be purchased for the media advertising campaign prior to airing of any of the resultant combination of inventory units in the media advertising campaign.

2. The method of claim 1, wherein the media advertising campaign comprises a television advertising campaign.

3. The method of claim 1, wherein the media advertising campaign comprises a radio, Internet broadcast, or video-on-demand advertising campaign.

4. The method of claim 1, wherein steps (c) and (d) are performed within a given time constraint.

5. The method of claim 1, wherein step (c) is performed using a convex optimization process.

6. The method of claim 5, wherein the convex optimization process finds the minimum probability of people that are not reached by the feasible combinations of inventory units.

7. The method of claim 1, wherein the one or more parameters comprises the budget for the media advertising campaign, and wherein the method further comprising adjusting the budget for the media advertising campaign to determine an optimal budget to maximize target media audience reach.

8. The method of claim 1, wherein the one or more parameters comprises the target media audience for the media advertising campaign, and wherein the method further comprising adjusting the target media audience for the media advertising campaign to determine an optimal target audience to maximize media audience reach for a given budget.

9. The method of claim 1, wherein the one or more parameters comprises the target media audience or the budget for the media advertising campaign, and wherein the method further comprising generating a logarithmic curve to be displayed in the graphical user interface illustrating diminishing returns to assist a user in adjusting the budget for the media advertising campaign or the target media audience to optimize media audience reach.

10. The method of claim 1, wherein the target media audience comprises a subset of the total media audience selected based on desired demographics, viewing or listening behavior, or viewer or listener purchasing characteristics for the media advertising campaign.

11. The method of claim 1, wherein the target media audience comprises a plurality of respondents, each having a given weight representative of its proportion of a total media audience used for calculating the target media audience reach.

12. The method of claim 1, wherein the historical audience data comprises directly measured audience data.

13. The method of claim 1, wherein step (b) comprises determining the probability of the target media audience viewing or listening to each of the plurality of inventory units by applying a forecasting and prediction process on the historical audience data for the target media audience.

14. A computer system, comprising:
   at least one processor;
   memory associated with the at least one processor; and
   a program supported in the memory for selecting inventory units for a media advertising campaign comprising one or more advertisements, the program containing a plurality of instructions which, when executed by the at least one processor, cause the at least one processor to:
   (a) receive information identifying (i) a target media audience, (ii) a plurality of inventory units in which the one or more advertisements may be included and a given price for each inventory unit, and (iii) a budget for the media advertising campaign;
   (b) determine the probability of the target media audience viewing or listening to each of the plurality of inventory units based on historical audience data;
   (c) identifying a plurality of feasible combinations of inventory units meeting the budget for the media advertising campaign, then determine an expected target media audience reach for each feasible combination of inventory units based on the probabilities determined in step (b);

(d) select the feasible combination of inventory units providing the greatest media audience reach for the media advertising campaign; and (e) display results of step (d) to a user in a graphical user interface and enable the user to adjust one or more parameters to iteratively determine an optimal budget or an optimal target media audience and identify a resultant combination of inventory units to be purchased for the media advertising campaign prior to airing of any of the resultant combination of inventory units in the media advertising campaign.

15. The system of claim 14, wherein the media advertising campaign comprises a television advertising campaign.

16. The system of claim 14, wherein the media advertising campaign comprises a radio, Internet broadcast, or video-on-demand advertising campaign.

17. The system of claim 14, wherein the at least one processor performs (c) and (d) within a given time constraint.

18. The system of claim 14, wherein the at least one processor performs (c) using a convex optimization process.

19. The system of claim 18, wherein the convex optimization process finds the minimum probability of people that are not reached by the feasible combinations of television inventory units.

20. The system of claim 14, wherein the one or more parameters comprises the budget for the media advertising campaign, and the program further comprises instructions for adjusting the budget for the media advertising campaign to determine an optimal budget to maximize target media audience reach.

21. The system of claim 14, wherein the one or more parameters comprises the target media audience for the media advertising campaign, and the program further comprises instructions for adjusting the target media audience for the media advertising campaign to determine an optimal target audience to maximize media audience reach for a given budget.

22. The system of claim 14, wherein the one or more parameters comprises the target media audience or the budget for the media advertising campaign, and wherein the program further comprises instructions for generating a logarithmic curve to be displayed in a user interface illustrating diminishing returns to assist a user in adjusting the budget for the media advertising campaign or the target media audience to optimize media audience reach.

23. The system of claim 14, wherein the media television audience comprises a subset of the total media audience selected based on desired demographics, viewing or listening behavior, or viewer or listener purchasing characteristics for the media advertising campaign.

24. The system of claim 14, wherein the target media audience comprises a plurality of respondents, each having a given weight representative of its proportion of a total media audience use for calculating the target media audience reach.

25. The system of claim 14, wherein the historical media audience data comprises directly measured media audience data.

26. The system of claim 14, wherein (b) comprises determining the probability of the target media audience viewing or listening to each of the plurality of media inventory units by applying a forecasting and prediction process on the historical media audience data for the target media audience.

27. A computer-implemented method of selecting inventory units for a media advertising campaign comprising one or more advertisements to optimize audience reach for a target media audience, said media advertising campaign having a given budget, the method comprising the steps of:

(a) calculating, by a computer system, a projected probability that members of the target audience will view or listen to each of a plurality of inventory units in which the one or more advertisements may be included based on historical data;

(b) searching, by the computer system using a convex optimization process, for a feasible combination of inventory units meeting the media advertising campaign budget that has the highest expected reach of the targeted audience based on the projected probabilities calculated in step (a); and (c) displaying results of step (b) to a user in a graphical user interface and enabling the user to adjust one or more parameters to iteratively determine an optimal budget or an optimal target media audience and identifying a resultant combination of inventory units to be purchased for the media advertising campaign prior to airing of any of the resultant combination of inventory units in the media advertising campaign.

28. The method of claim 27, wherein the media advertising campaign comprises a television advertising campaign.

29. The method of claim 27, wherein the media advertising campaign comprises a radio, Internet broadcast, or video-on-demand advertising campaign.

30. The method of claim 27, wherein steps (a) and (b) are performed within a given time constraint.

31. The method of claim 27, wherein the convex optimization process finds the minimum probability of viewers that are not reached by the feasible combinations of inventory units.

32. The method of claim 27, wherein the one or more parameters comprises the budget for the media advertising campaign, and wherein the method further comprising adjusting the budget for the media advertising campaign to determine an optimal budget to maximize target media audience reach.

33. The method of claim 27, wherein the one or more parameters comprises the target media audience for the media advertising campaign, and wherein the method further comprising adjusting the target media audience for the media advertising campaign to determine an optimal target audience to maximize media audience reach for a given budget.

34. The method of claim 27, wherein the one or more parameters comprises the target media audience or the budget for the media advertising campaign, and wherein the method further comprising generating a logarithmic curve to be displayed in the graphical user interface illustrating diminishing returns to assist a user in adjusting the budget for the media advertising campaign or the media television audience to optimize media audience reach.

35. The method of claim 27, wherein the target media audience comprises a subset of the total media audience selected based on desired demographics, viewing or listening behavior, or viewer or listener purchasing characteristics for the media advertising campaign.

36. The method of claim 27, wherein the target media audience comprises a plurality of respondents, each having a given weight representative of its proportion of a total media viewing audience use for calculating the target media audience reach.

37. The method of claim 27, wherein the historical data comprises directly measured audience data.

38. The method of claim 27, wherein step (b) comprises determining the probability of the target media audience viewing or listening to each of the plurality of inventory units by applying a forecasting and prediction process on the historical data for the target media audience.

* * * * *